US012480548B2

United States Patent
Jansen et al.

(10) Patent No.: US 12,480,548 B2
(45) Date of Patent: Nov. 25, 2025

(54) DOUBLE-JOINTED COUPLING, BOGIE, RAIL VEHICLE, INDUSTRIAL APPLICATION AND COMPUTER PROGRAM PRODUCT

(71) Applicant: Flender GmbH, Bocholt (DE)

(72) Inventors: Andre Jansen, Borken (DE); Michael Schnucklake, Bocholt (DE)

(73) Assignee: Flender GmbH, Bocholt (DE)

( * ) Notice: Subject to any disclaimer, the term of this patent is extended or adjusted under 35 U.S.C. 154(b) by 423 days.

(21) Appl. No.: 18/011,057

(22) PCT Filed: Mar. 17, 2021

(86) PCT No.: PCT/EP2021/056862
§ 371 (c)(1),
(2) Date: Dec. 16, 2022

(87) PCT Pub. No.: WO2021/254670
PCT Pub. Date: Dec. 23, 2021

(65) Prior Publication Data
US 2023/0220886 A1    Jul. 13, 2023

(30) Foreign Application Priority Data

Jun. 19, 2020   (EP) .................................... 20181091

(51) Int. Cl.
*B61C 9/44* (2006.01)
*B61F 3/16* (2006.01)
*F16D 3/18* (2006.01)

(52) U.S. Cl.
CPC ............... *F16D 3/185* (2013.01); *B61C 9/44* (2013.01); *B61F 3/16* (2013.01); *F16D 2300/12* (2013.01); *Y10T 74/18664* (2015.01)

(58) Field of Classification Search
CPC ....... F16D 3/185; F16D 2300/12; B61C 9/44; B61F 3/16; Y10T 74/18664
(Continued)

(56) References Cited

U.S. PATENT DOCUMENTS 2,918,827 A * 12/1959 Brown .................. F16H 25/229
74/89.34
3,475,043 A    10/1969 Anderson
(Continued)

FOREIGN PATENT DOCUMENTS

| CN | 101277860 A | 10/2008 |
|---|---|---|
| CN | 102537097 A | 7/2012 |

(Continued)

OTHER PUBLICATIONS

International Search Report issued by the European Patent Office in International Application PCT/EP2021/056862 on Jun. 21, 2021.
(Continued)

*Primary Examiner* — Greg Binda
(74) *Attorney, Agent, or Firm* — Henry M. Feiereisen LLC

(57) ABSTRACT

A double-jointed coupling includes a carrier ring with an internal tooth arrangement, a hollow pinion shaft connected to the internal tooth arrangement of the carrier ring, and an intermediate shaft with a coupling tooth arrangement for engagement in the internal tooth arrangement. The coupling tooth arrangement is constructed on the intermediate shaft such as to enable passage of the intermediate shaft through the hollow pinion shaft for passage through the hollow pinion shaft. A thrust ring is arranged on the intermediate shaft in a region of the coupling tooth arrangement and constructed for passage through the hollow pinion shaft.

12 Claims, 7 Drawing Sheets

(58) Field of Classification Search
USPC .................. 464/93, 158; 74/89.34; 295/39; 105/182.1
See application file for complete search history.

(56) References Cited

U.S. PATENT DOCUMENTS

| | | | | |
|---|---|---|---|---|
| 4,037,430 | A * | 7/1977 | Wright | .................. B21B 35/143 |
| | | | | 464/158 |
| 6,354,414 | B1 | 3/2002 | Sueshige et al. | |
| 8,900,061 | B2 * | 12/2014 | Jansen | ...................... F16D 3/62 |
| | | | | 464/158 |
| 2010/0307370 | A1 | 12/2010 | Rodet | |
| 2015/0240885 | A1 | 8/2015 | Szentmihályi et al. | |
| 2017/0286572 | A1 | 10/2017 | Hershey et al. | |

FOREIGN PATENT DOCUMENTS

| | | |
|---|---|---|
| DE | 1 195 126 | 6/1965 |
| DE | 295 22 268 | 4/2001 |
| EP | 2 327 898 | 6/2011 |
| EP | 2 457 795 | 5/2012 |
| GB | 1 329 490 | 9/1973 |
| WO | WO 2007/036219 | 4/2007 |

OTHER PUBLICATIONS

Chinese Search Report Issued on May 23, 2025 with respect to counterpart Chinese patent application 202180043617X.
Translation of Chinese Search Report issued on May 23, 2025 with respect to counterpart Chinese patent application 202180043617X.

* cited by examiner

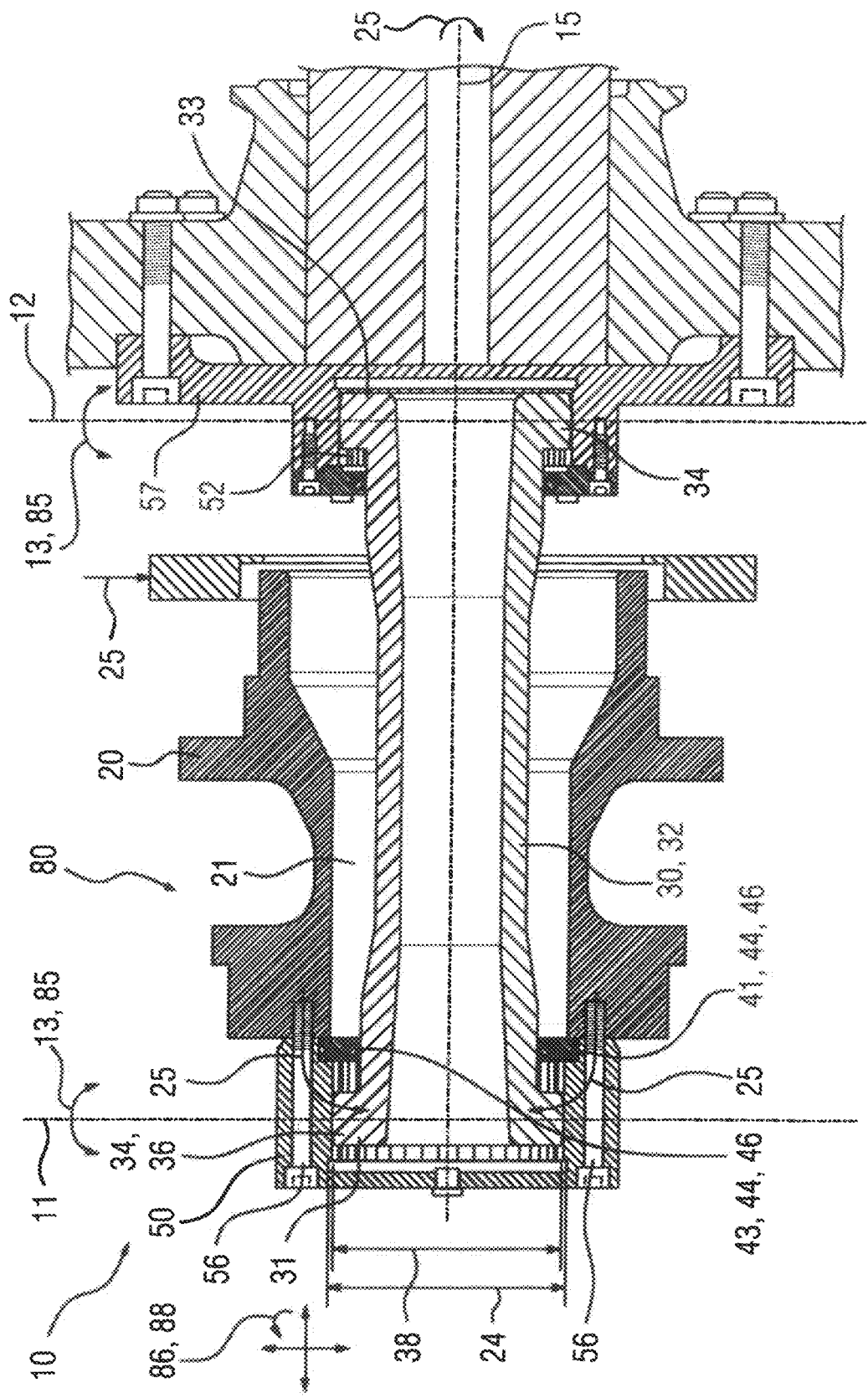

DOUBLE-JOINTED COUPLING, BOGIE, RAIL VEHICLE, INDUSTRIAL APPLICATION AND COMPUTER PROGRAM PRODUCT

CROSS-REFERENCES TO RELATED APPLICATIONS

This application is the U.S. National Stage of International Application No. PCT/EP2021/056862, filed Mar. 17, 2021, which designated the United States and has been published as International Publication No. WO 2021/254670 A1 and which claims the priority of European Patent Application, Serial No. 20181091.8, filed Jun. 19, 2020, pursuant to 35 U.S.C. 119(a)-(d).

BACKGROUND OF THE INVENTION

The invention relates to a double-jointed coupling and a method for assembling a double-jointed coupling. The invention also relates to a bogie of a rail vehicle having such a double-jointed coupling and a corresponding rail vehicle itself. The invention further relates to a computer program product for simulating an operating behavior of such a double-jointed coupling and an industrial application which is provided with a double-jointed coupling according to the invention.

The publication EP 2 457 795 A1 discloses a coupling apparatus for connecting a driving machine component to a driven machine component. The coupling apparatus comprises a toothed coupling and an articulated lever coupling. The toothed coupling is connected to a hollow shaft, through which a shaft which is connected to an external tooth arrangement of the toothed coupling and a connection flange for plates extends in the assembled state. The shaft is constructed so as to be divisible between the toothed coupling and the articulated lever coupling for assembling the coupling apparatus.

The international patent application WO 2007/036219 A1 sets out a cardanic double-jointed coupling for rail vehicles which comprises a hollow pinion shaft, through which an intermediate shaft extends. The intermediate shaft is releasably connected to an externally toothed coupling hub of a toothed coupling at one end.

The utility model DE 295 22 268 U1 discloses a transverse drive for a rail vehicle, in which a large wheel meshes with a hollow pinion shaft. A toothed shaft is arranged in the hollow pinion shaft. The toothed shaft has at both ends external tooth arrangements, wherein one of the external tooth arrangements engages in a formed-on internal tooth arrangement of the hollow pinion shaft. The other externally toothed end engages in an internal tooth arrangement of a coupling flange.

Double-jointed couplings are used in various applications and are subjected to stresses which make it necessary to inspect the couplings. There is further a desire for couplings which are simple and cost-effective to produce and which at the same time have a high compensation capacity against deflections. This particularly applies to industrial applications or rail vehicles. An object of the invention is to provide a double-jointed coupling which provides an improvement in at least one of the indicated points.

SUMMARY OF THE INVENTION

The object is achieved by a double-jointed coupling according to the invention. The double-jointed coupling comprises a hollow pinion shaft which is connected to an internal tooth arrangement so that a rotation of the hollow pinion shaft can be transmitted to the internal tooth arrangement. The double-jointed coupling also comprises an intermediate shaft which is connected to a coupling tooth arrangement so that a rotation of the intermediate shaft can be transmitted to the coupling tooth arrangement. The coupling tooth arrangement is constructed for engagement in the internal tooth arrangement on the hollow pinion shaft so that at one end of the hollow pinion shaft a toothed coupling is constructed. Accordingly, a rotation of the hollow pinion shaft can be transmitted to the intermediate shaft via the toothed coupling. According to the invention the coupling tooth arrangement which is connected to the intermediate shaft is constructed to be introduced through the hollow pinion shaft. To this end, the coupling tooth arrangement has an external diameter which is smaller than an internal diameter of the hollow pinion shaft. This allows the intermediate shaft to be separately provided with additional components and the intermediate shaft to be handled as a complete subassembly. Furthermore, the additional assembly of the double-jointed coupling requires a reduced number of components and assembly steps. Furthermore, the double-jointed coupling according to the invention can be quickly disassembled into its greatest subassemblies by pulling apart the intermediate shaft and the hollow pinion shaft. Maintenance or repair of the double-jointed coupling is thereby simplified.

In one embodiment of the claimed double-jointed coupling, the coupling tooth arrangement is integrally constructed with the intermediate shaft, that is to say, cannot be separated from each other without being destroyed. The coupling tooth arrangement can be produced from the same workpiece as the intermediate shaft, whereby the number of components in the claimed double-jointed coupling is further reduced. Alternatively, the coupling tooth arrangement and the intermediate shaft can also be connected to each other in a positive-locking manner, for example, by means of welding. As a result of the integral nature of the coupling tooth arrangement with the intermediate shaft, an increased cost efficiency and a high degree of modularity are achieved, the processing complexity is minimized and the maintenance friendliness of the double-jointed coupling is further increased.

Furthermore, a thrust ring can be arranged in a region of the coupling tooth arrangement on the intermediate shaft, in this instance, the thrust ring has an external diameter which is smaller than the internal diameter of the hollow pinion shaft. The thrust ring can thereby be introduced through the hollow pinion shaft together with the intermediate shaft. The thrust ring allows a seal to be provided in the assembled state between the toothed coupling and the hollow pinion shaft and thus a loss of operating medium, for example, lubricant, to be reduced. In order to provide the seal, at least one sealing element can be arranged on an external face of the thrust ring, for example, an O-ring. To this end, for example, a circumferential groove can be constructed in the external face of the thrust ring. In accordance with an axial position of the at least one sealing element, the thrust ring is constructed to produce a seal between the intermediate shaft and the hollow pinion shaft or a carrier ring. To this end, the internal diameter of the hollow pinion shaft and the external diameter of the thrust ring are selected so that between them an annular space can be constructed with an assembly gap width which is smaller than a radial dimension of an unloaded sealing element. Such an assembly gap width can be readily adjusted by corresponding dimensioning of the external diameter of the coupling tooth arrangement and the internal diameter of the hollow pinion shaft. In particular, alternatively or additionally, a securing ring by which an axial movement of the intermediate shaft can be supported, that is to say, limited, can be arranged on the external face. An end stop for the coupling tooth arrangement is thereby provided. The securing ring also allows reliable assembly. The term "axial movement" or "axial position" is intended in this instance to be understood to mean a movement or position along a rotation axis of the intermediate shaft and the hollow pinion shaft.

Furthermore, at least one sealing element can be arranged on an internal face on the thrust ring. A seal can thereby be produced between the intermediate shaft and the thrust ring. To this end, the sealing element can, for example, be in the form of an O-ring which is received in a circumferential groove in the internal face of the thrust ring. A loss of operating media, for example, a discharge of lubricant from the toothed coupling, can also thereby be reduced, in an additional embodiment of the claimed double-jointed coupling, the sealing element has two sealing lips. Such sealing elements are also referred to as duo-sealing rings and provide an increased sealing action.

In another embodiment of the claimed double-jointed coupling, the thrust ring is constructed for axial support on the hollow pinion shaft. To this end, the thrust ring has an external diameter which is greater than the internal diameter of the hollow pinion shaft. An axial movement of the intermediate shaft can thereby be supported and an additional securing ring for this purpose is unnecessary. Consequently, the claimed double-jointed coupling has a reduced number of components.

Furthermore, the carrier ring on which the internal tooth arrangement is arranged can be releasably connected to the hollow pinion shaft. To this end, the carrier ring is substantially in the form of a border, in which the internal tooth arrangement is releasably arranged or is integrally constructed therewith. The internal tooth arrangement can be separated from the claimed double-jointed coupling by the carrier ring and can be examined and repaired separately. Similarly, the carrier ring can be produced separately. The production complexity is thereby reduced for the claimed double-jointed coupling. During disassembly of the claimed double-jointed coupling, a torque transmission from the hollow pinion shaft to the intermediate shaft can be interrupted by releasing the carrier ring from the hollow pinion shaft. Components in the double-jointed coupling itself, for example, the intermediate shaft, or in a drive train to which the double-jointed coupling belongs, become free-floating as a result of such an interruption of the torque transmission. The carrier ring can be released in an early stage of disassembly from the hollow pinion shaft so that the disassembly overall is simplified at an early stage. Therefore, the claimed double-jointed coupling affords a high level of maintenance friendliness. Alternatively, the carrier ring can be constructed integrally with the hollow pinion shaft and have an internal tooth arrangement. As a result of a carrier ring which is constructed integrally with the hollow pinion shaft, the concept of modularity is further implemented and by reducing the number of components the assembly complexity is reduced.

Furthermore, the intermediate shaft in the claimed double-jointed coupling can be constructed with a lamellar flange. In this case, the lamellar flange is arranged at an end of the intermediate shaft facing away from the toothed coupling. The lamellar flange can be connected to lamella bundles so that, in addition to the toothed coupling as the first articulation plane, a second articulation plane can also be produced at that location. The lamellar flange can be produced from the same workpiece as the intermediate shaft to this end. Alternatively, the lamellar flange can also be connected in a materially engaging manner to the intermediate shaft, for example, by welding. As a result of the integral nature between the lamellar flange and the intermediate shaft, they cannot be separated from each other without being destroyed. The lamellar flange can thereby be produced in a generally simple, rapid and economical manner. Furthermore, the lamellar flange is provided with assembly holes which allow the intermediate shaft to be secured to the hollow pinion shaft during assembly. The assembly of the claimed double-jointed coupling can thereby be interrupted in a selective manner. Alternatively, the intermediate shaft can also be provided integrally with an additional coupling tooth arrangement, by which an additional toothed coupling is produced.

In another embodiment of the claimed double-jointed coupling, the intermediate shaft is in the form of a hollow shaft. This allows a weight-saving construction type for the intermediate shaft and a reduction of the inertial moment. The clear space in the hollow shaft is also usable for introducing tools, for example, for a central screw.

The object forming the basis is also achieved by a method according to the invention for assembling a double-jointed coupling. The double-jointed coupling comprises a hollow pinion shaft, an intermediate shaft having a coupling tooth arrangement, a thrust ring and a carrier ring which are intended to be assembled by the method according to the invention. In a first step, the hollow pinion shaft which is retained or secured in a suitable form is provided. In a subsequent second step, the intermediate shaft is introduced through the hollow pinion shaft. In this case, the intermediate shaft is pushed in the direction of the coupling tooth arrangement which is constructed thereon from one end of the hollow pinion shaft to the opposite end. After the intermediate shaft has been introduced, the coupling tooth arrangement at least partially projects beyond the hollow pinion shaft in an axial direction. In a subsequent third step, at least one sealing element and/or securing element is/are fitted to an external face of a thrust ring which is arranged on the intermediate shaft. The at least one sealing element can be in the form of an O-ring and produce a seal between the thrust ring, and therefore the intermediate shaft, and the hollow pinion shaft. The securing element may, for example, be in the form of a securing ring which is suitable for supporting an axial movement of the intermediate shaft. In an additional fourth step, a carrier ring is fixed to the hollow pinion shaft. The carrier ring has an internal tooth arrangement which is constructed to engage with the coupling tooth arrangement. By fixing the carrier ring to the hollow pinion shaft, the engagement between the coupling tooth arrangement and the internal tooth arrangement is produced and consequently a toothed coupling is produced. Accordingly, a torque transmission from the hollow pinion shaft to the intermediate shaft is enabled and the main functionality of the double-jointed coupling is thus provided.

The hollow pinion shaft and the intermediate shaft constitute the heaviest components of the double-jointed coupling according to the invention. In the method according to the invention, the number of assembly steps in which these components have to be handled is accordingly minimized. The fitting of the at least one sealing element and/or securing element can readily be carried out as soon as the intermediate shaft is introduced through the hollow pinion shaft. Furthermore, a relatively light component has to be handled in order to provide the torque transmission between the hollow pinion shaft and the intermediate shaft with the carrier ring. The internal tooth arrangement and/or the carrier ring is/are able to be adapted by corresponding tolerances in order to ensure simple assembly in the described third step. Generally, the assembly of the indicated double-jointed coupling is thereby accelerated and simplified and consequently an increased degree of maintenance friendliness is also achieved. The method according to the invention can also be developed to form a method for disassembling a corresponding double-jointed coupling with a transposed sequence in terms of the sequence of the indicated steps.

In one embodiment of the claimed method, the thrust ring is fitted in the first step to the intermediate shaft. The thrust ring can be constructed as a split ring which is assembled during fitting to the intermediate shaft. In this case, the thrust ring is fixed to the intermediate shaft in the region of the coupling tooth arrangement, that is to say, substantially adjacent thereto, and introduced through the hollow pinion shaft in the second step together with the coupling tooth arrangement. Alternatively, the thrust ring can be fitted to the intermediate shaft directly after the second step, that is to say, when the coupling tooth arrangement is introduced through the hollow pinion shaft. To this end, the thrust ring can also be in the form of a split ring which is assembled during fitting to the intermediate shaft.

Similarly, the object is achieved by a bogie according to the invention for a rail vehicle. The bogie comprises a traction motor which is connected to the double-jointed coupling so as to transmit torque. The double-jointed coupling is again connected to an axle or a wheel of the rail vehicle via a gear mechanism so as to transmit torque. According to the invention, the double-jointed coupling is constructed according to one of the embodiments set out above. As a result of the double-jointed coupling according to the invention, the production, maintenance and repair of the bogie is simplified. In particular, the double-jointed coupling can be assembled and/or disassembled according to one of the above-described methods.

Similarly, the indicated object is achieved by a rail vehicle according to the invention which comprises a wagon body, to which at least one bogie is fitted. In this case, the term "rail vehicle" is intended to be understood to be any motorized vehicle for locomotion by means of a wheel/rail system. The rail vehicle may, for example, be in the form of a locomotive, tramcar, railcar train, single-rail train, suspended train, underground train, suburban train or tram. In this instance, the bogie is constructed according to one of the above-described embodiments. The operation of such rail vehicles becomes more efficient by using the bogie according to the invention because downtimes can be reduced as a result of the increased maintenance friendliness of the bogie.

Furthermore, the object forming the basis is achieved by an industrial application according to the invention which comprises a drive unit which is connected to an output unit so as to transmit torque. The drive unit may, for example, be in the form of an electric motor, combustion engine or hydraulic motor. As a result of the drive unit, a drive power which is intended to be transmitted to the output unit is provided via an output shaft. The drive unit may, for example, be in the form of a mill, vertical mill, sugar mill, cement mill, stone breaker, conveyor belt, pump, roller press, slat conveyor, drilling mill, rotary furnace, rotary mechanism, agitating mechanism, lifting apparatus, milling press or scrap crusher. To this end, the output unit has an input shaft which is connected via a coupling to the output shaft of the drive unit. The coupling is constructed according to the invention according to one of the above-indicated embodiments.

Similarly, the indicated object is achieved by a computer program product according to the invention which is constructed to simulate an operating behavior of a double-jointed coupling. The term "operating behavior" is intended to be understood to be, for example, bending behavior or wear behavior of individual components. A kinematic arrangement and/or a vibration characteristic of the double-jointed coupling can also be simulated by means of the computer program product. The operating behavior of the double-jointed coupling can thereby be simulated in an assembled state in a rail vehicle. This can include both travel operation and maintenance operation. The double-jointed coupling is accordingly mapped in terms of the physical behavior thereof in the computer program product according to the Invention and can be provided with a data interface, by which additional computer program products directed towards simulations can transmit input values to the computer program product according to the invention. In the same manner, the computer program product can also be provided with a data interface for transmitting output values of the computer program product according to the invention to additional computer program products directed towards simulations. As a result of the computer program product, for example, measurement data of sensors which are fitted to the double-jointed coupling and/or the bogie can be checked for plausibility. By means of the computer program product, inter alia a defective sensor on the double-jointed coupling and/or the bogie can thus be detected. The computer program product may be in the form of a so-called digital twin. Such digital twins are set out, for example, in the Offenlegungsschrift US 2017/286572 A1. The disclosed content of US 2017/286572 A1 is also included in the present application by reference. According to the invention, the double-jointed coupling which can be simulated by the claimed computer program product is constructed according to one of the above-indicated embodiments.

BRIEF DESCRIPTION OF THE DRAWING

The invention is explained in greater detail below with reference to individual embodiments in Figures. The Figures are intended to be read as complementing each other in that the same reference numerals in different Figures have the same technical meaning. The features of the individual embodiments can also be combined with each other. Furthermore, the embodiments which are shown in the Figures can be combined with the above-indicated features. In the detailed drawings:

FIG. 6 shows a longitudinal section of a second embodiment of the claimed double-jointed coupling in the assembled state;

DETAILED DESCRIPTION OF PREFERRED EMBODIMENTS

Figure 1:
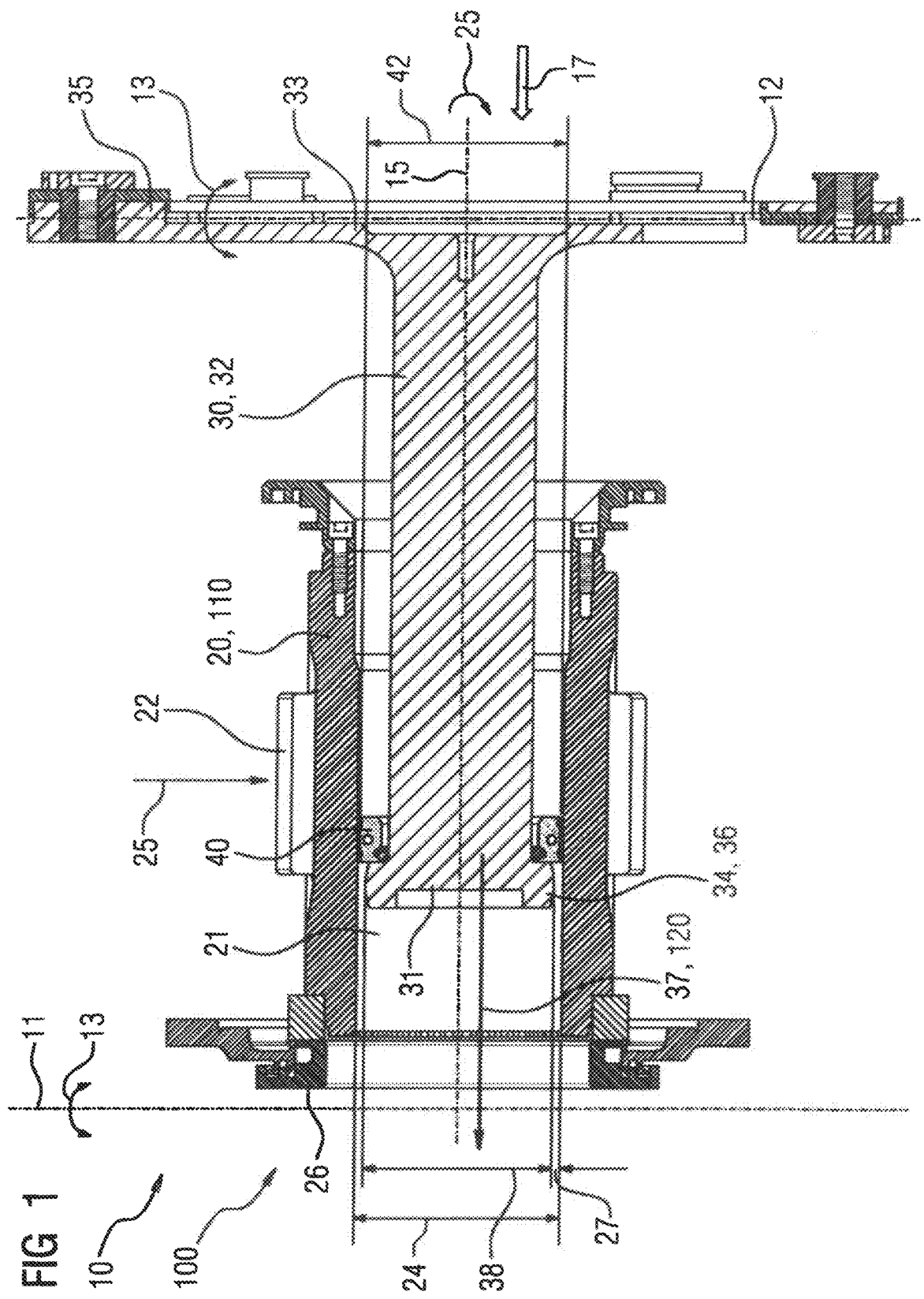
FIG. 1 schematically shows a first embodiment of the claimed double-jointed coupling during a stage of the claimed production method.
Figure 2:
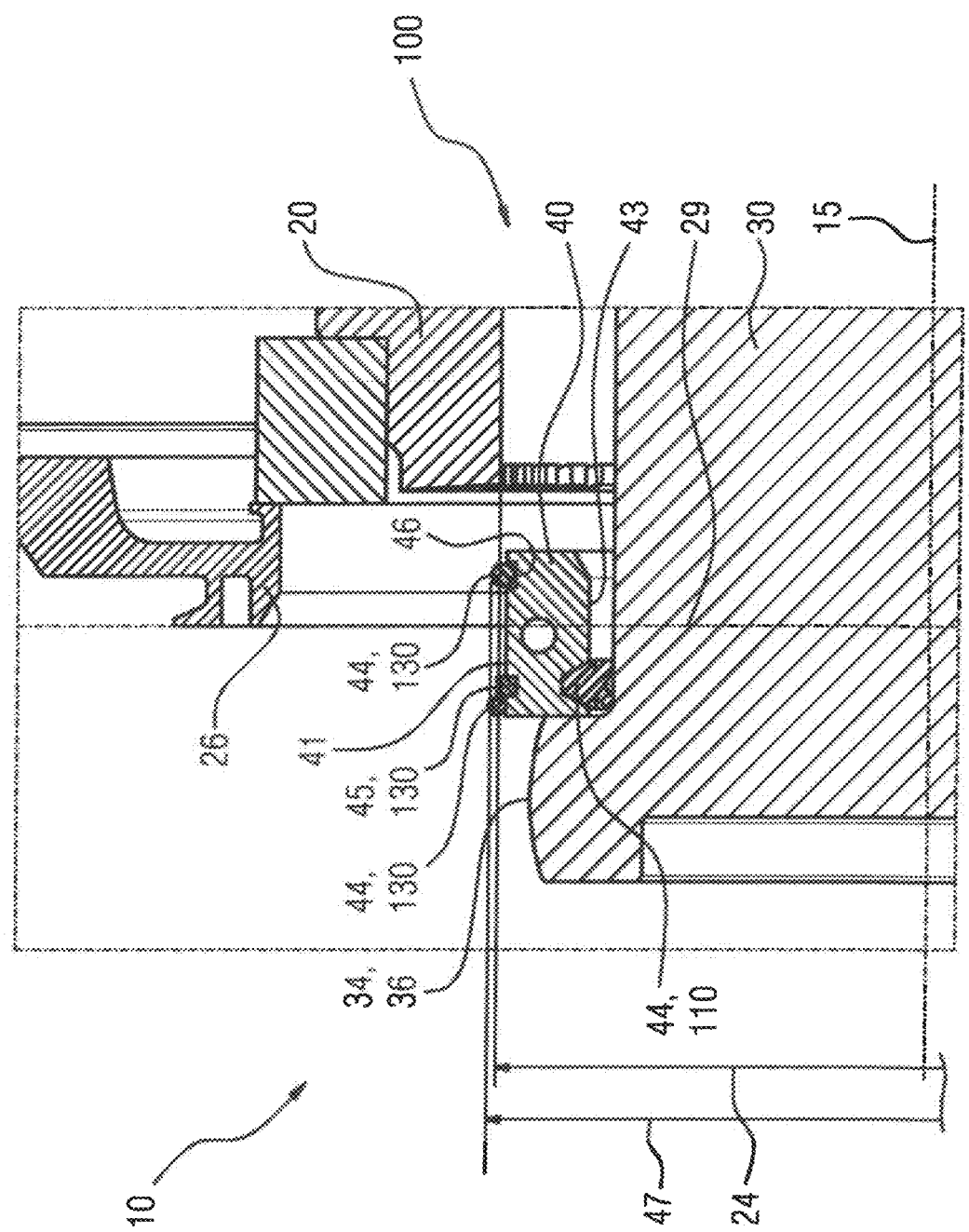
FIG. 2 schematically shows the first embodiment of the claimed double-jointed coupling during an additional stage of the claimed production method.

FIG. 1 schematically shows a longitudinal section of a first embodiment of the claimed double-jointed coupling 10 in a stage of the claimed method 100. FIG. 1 is based on the fact that a first step 110, in which a hollow pinion shaft 20 is provided, has already been concluded and a thrust ring 40 is fixed on an intermediate shaft 30. According to FIG. 1, a second step 120, in which the intermediate shaft 30 is introduced through the hollow pinion shaft 20, is carded out. To this end, the hollow pinion shaft 20 has a clear internal space 21. The movement of the introduction is indicated in FIG. 1 with the arrow 37. The hollow pinion shaft 20 has a pinion tooth arrangement 22, via which torque 25 can be introduced into the hollow pinion shaft 20 and, as a result of the torque 25, a rotation of the hollow pinion shaft 20 and the intermediate shaft 30 about a rotation axis 15 can be brought about. The intermediate shaft 30 has a shaft portion 32 which has a first end 31, at which a coupling tooth arrangement 34 is constructed. The coupling tooth arrangement 34 is a spiral tooth arrangement 36 and is constructed integrally with the shaft portion 32. As a result of the spiral tooth arrangement 36, at the first end 31 of the intermediate shaft 30 in a first articulation plane 11 a tilting movement 13 can be carried out between the hollow pinion shaft 20 and the intermediate shaft 30. The coupling tooth arrangement 34 has an external diameter 38 which is smaller than an internal diameter 24 of the hollow pinion shaft 20. Accordingly, there is located between the coupling tooth arrangement 34 and the hollow pinion shaft 20 a wall spacing 27 which allows the introduction 37 of the intermediate shaft 30 through the hollow pinion shaft 20 in the direction of an assembly flange 26. The thrust ring 40, which is arranged on the intermediate shaft 30 on the shaft portion 32, when viewed along the rotation axis 15, in the region of the coupling tooth arrangement has an external diameter 42 which is smaller than the internal diameter 24 of the hollow pinion shaft 20. The thrust ring 40 is in the form of a split ring the members of which are Joined in the radial direction and which can be introduced through the hollow pinion shaft 20 in the assembled state. For introduction 37, an axial force 17 can be applied to a lamellar flange 35 at a second end 33 of the intermediate shaft 30. The lamellar flange 35 belongs to a lamellar coupling which is not illustrated in greater detail and through which in a second articulation plane 12 in the region of the second end 33 of the intermediate shaft 30 a tilting movement 13 is possible, FIG. 2 schematically shows the first embodiment of the claimed double-jointed coupling 10 in a longitudinally sectioned detailed view in another stage which follows the stage according to FIG. 1 in the claimed method 100. The intermediate shaft 30 is introduced through the hollow pinion shaft 20 so far that the coupling tooth arrangement 34 projects out of the hollow pinion shaft 20. The thrust ring 40 which is arranged in the region of the coupling tooth arrangement 34 on the intermediate shaft 30 projects along the rotation axis 15 at least partially over an assembly plane 29 on the assembly flange 26. The thrust ring 40 has at an inner side 43 a circumferential groove 46, in which a sealing element 44 which is resiliently deformable in the radial direction, that is to say, substantially perpendicularly to the rotation axis 15 is received and therefore is suitable for centering the thrust ring 40 on the intermediate shaft 30. The sealing element 44 on the internal face 43 is already positioned at that location in the first method step 110 when the thrust ring 40 is fitted to the intermediate shaft 40, FIG. 2 shows a third step 130 of the claimed method 100, in which two sealing elements 44 are fitted to an external face 41 of the thrust ring 40. The sealing elements 44 are each received in a circumferential groove 46 in the external face 41 of the thrust ring 40. A securing ring 45, which is also fitted there in the third step 130, is received in an additional circumferential groove 46 between the sealing elements 44 on the external face 41. As a result of the securing ring 45, an axial movement of the intermediate shaft 30 in the assembled state can be limited. The securing ring 45 is constructed for support on the hollow pinion shaft 20, by which the axial movement of the intermediate shaft 30, that is to say, along the rotation axis 15, is limited. The sealing elements 44 have, as illustrated in FIG. 2, in an unloaded state, an external diameter 47 which is greater than the internal diameter 34 of the hollow pinion shaft 20. The sealing elements 44 at the external face 41 of the thrust ring 40 are constructed in a resiliently deformable manner.

Figure 3:
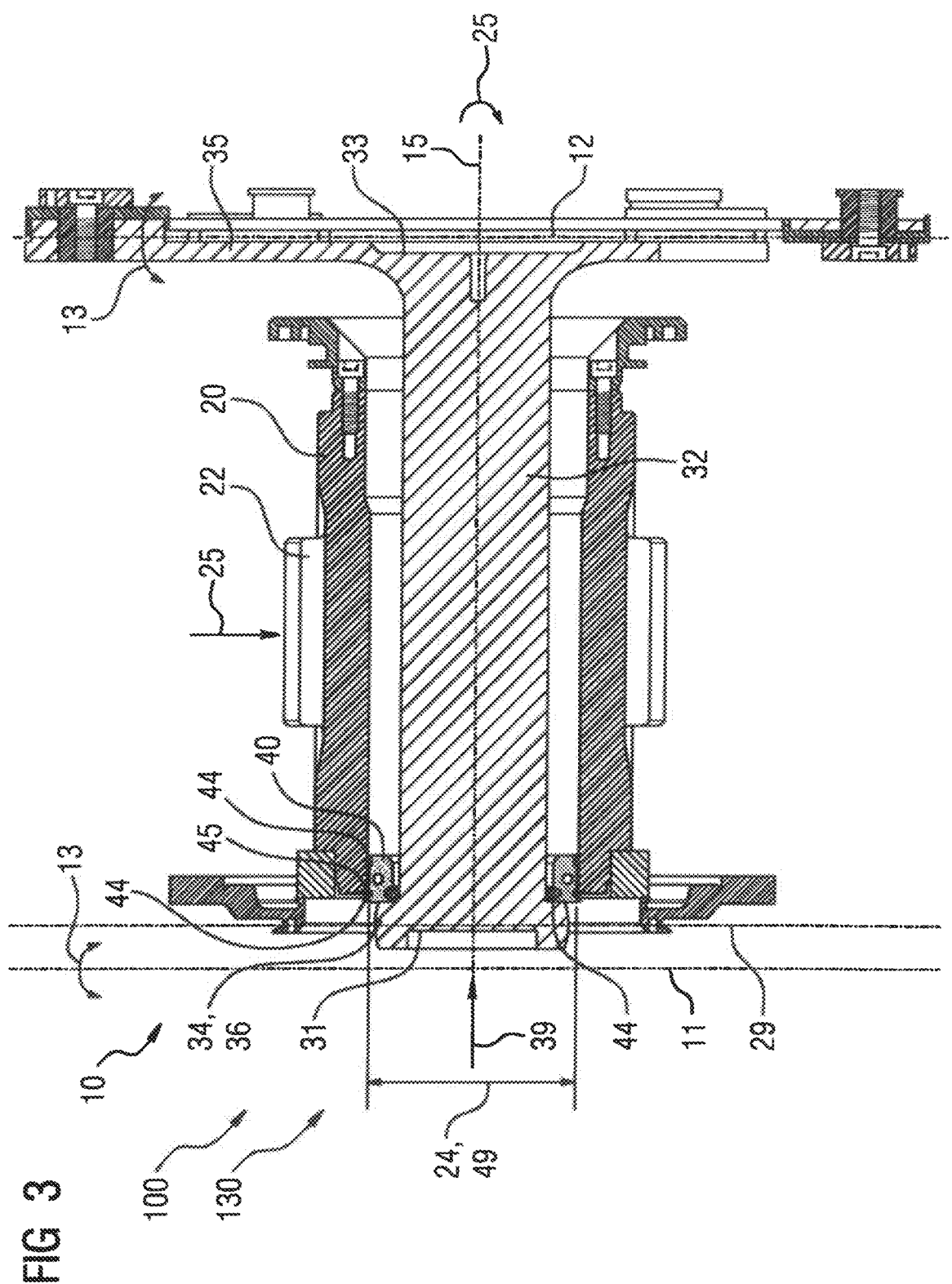
FIG. 3 schematically shows the first embodiment of the claimed double-jointed coupling during an additional stage of the claimed production method.

FIG. 3 illustrates the first embodiment of the claimed double-jointed coupling 10 as a longitudinal section in a stage which follows the stage according to FIG. 2 in the claimed method 100. FIG. 3 takes as a basis the fact that the third step 130 is carried out to such an extent that sealing elements 44 and a securing element 45 are arranged at the external face 41 on the thrust ring 40. Furthermore, in the third step 130 an axial force 39 is applied to the intermediate shaft 30 in order to press one of the sealing elements 44 into the hollow pinion shaft 20. In this case, the axial force 39 can be applied as a pressing force to the first end 31 of the intermediate shaft 30 or as a tension force to the second end 33 of the intermediate shaft 30. The thrust ring 40 is pressed by the coupling tooth arrangement 34 in such a manner that the sealing element 44 which is intended to be pressed in is compressed by the hollow pinion shaft 20, that is to say, the wall thereof. The sealing element 44 is provided in a loaded state in which the external diameter 49 of the sealing element 44 is identical to the internal diameter 24 of the hollow pinion shaft 20. A sealing action which prevents discharge of operating substances out of the region of the coupling tooth arrangement into the hollow pinion shaft 20 is thereby achieved. The third step 130 of the claimed method 100 is thereby concluded.

Figure 4:
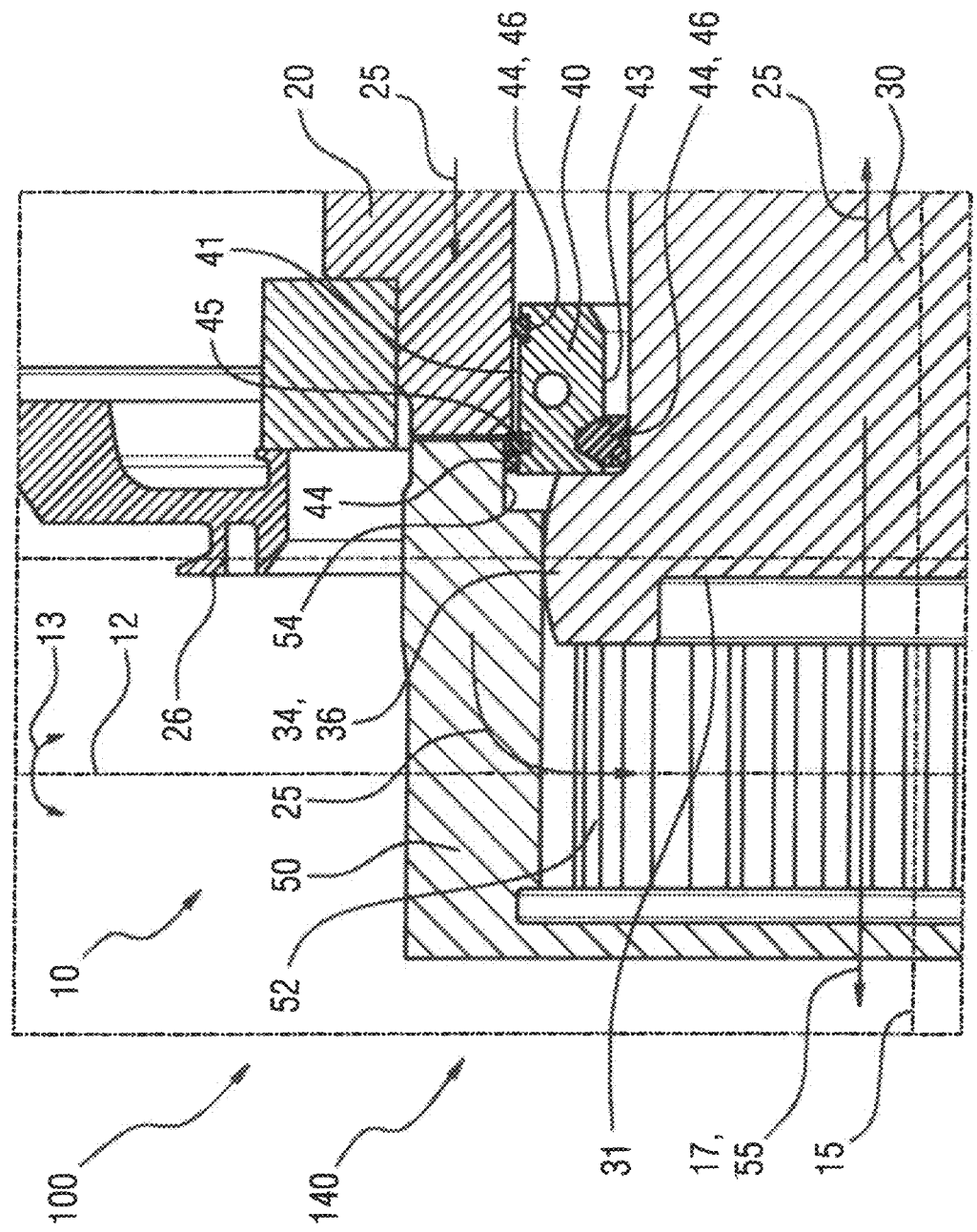
FIG. 4 schematically shows the first embodiment of the claimed double-jointed coupling during an additional stage of the claimed production method.

FIG. 4 shows the first embodiment of the claimed double-jointed coupling in a stage of the claimed method 100 which follows the stage in FIG. 3. In FIG. 4, a fourth step 140 is carried out in which a carrier ring 50 is mounted on the hollow pinion shaft 20 in the region of the first end 31 of the intermediate shaft 30. The carrier ring 50 has an internal tooth arrangement 52 which is constructed to engage with the coupling tooth arrangement 34 on the intermediate shaft 30. The coupling tooth arrangement 34 is in the form of a spiral tooth arrangement 36 so that, during engagement in the internal tooth arrangement 52 when viewed along the rotation axis 15, the first articulation plane 11 is located within the earner ring 50. In particular, the spiral tooth arrangement 36 is suitable for carrying out a tilting movement 13 in the internal tooth arrangement 52. In order to produce the engagement of the coupling tooth arrangement 34 with the internal tooth arrangement 52, an axial force 17 has to be applied to the intermediate shaft 30 in an axial direction, that is to say, along the rotation axis 15, and thus a position movement 55 of the intermediate shaft 30 has to be brought about. By producing the engagement, a transmission of torque 25 from the hollow pinion shaft 20 to the intermediate shaft 30 is enabled. The path of the transmission of the torque 25 is depicted in FIG. 4 by corresponding arrows. When the carrier ring 50 is fixed, the sealing element 44 on the thrust ring 40 which faces the first end 31 of the intermediate shaft 30 is compressed by the carrier ring 50. Accordingly, a seal is also present between the thrust ring 40 and the earner ring 50. With the fourth step 140 being carried out, the double-jointed coupling 10 is substantially mounted, that is to say, it is suitable for transmitting torque 25 from the hollow pinion shaft 20 to the intermediate shaft 30. Accordingly, the method 100 depicted in FIG. 1 to FIG. 4 has a small number of necessary steps 110, 120, 130, 140 which can quickly be carried out. The indicated steps 110, 120, 130, 140 can readily be transposed in order thus to provide a complementary disassembly method.

Figure 5:
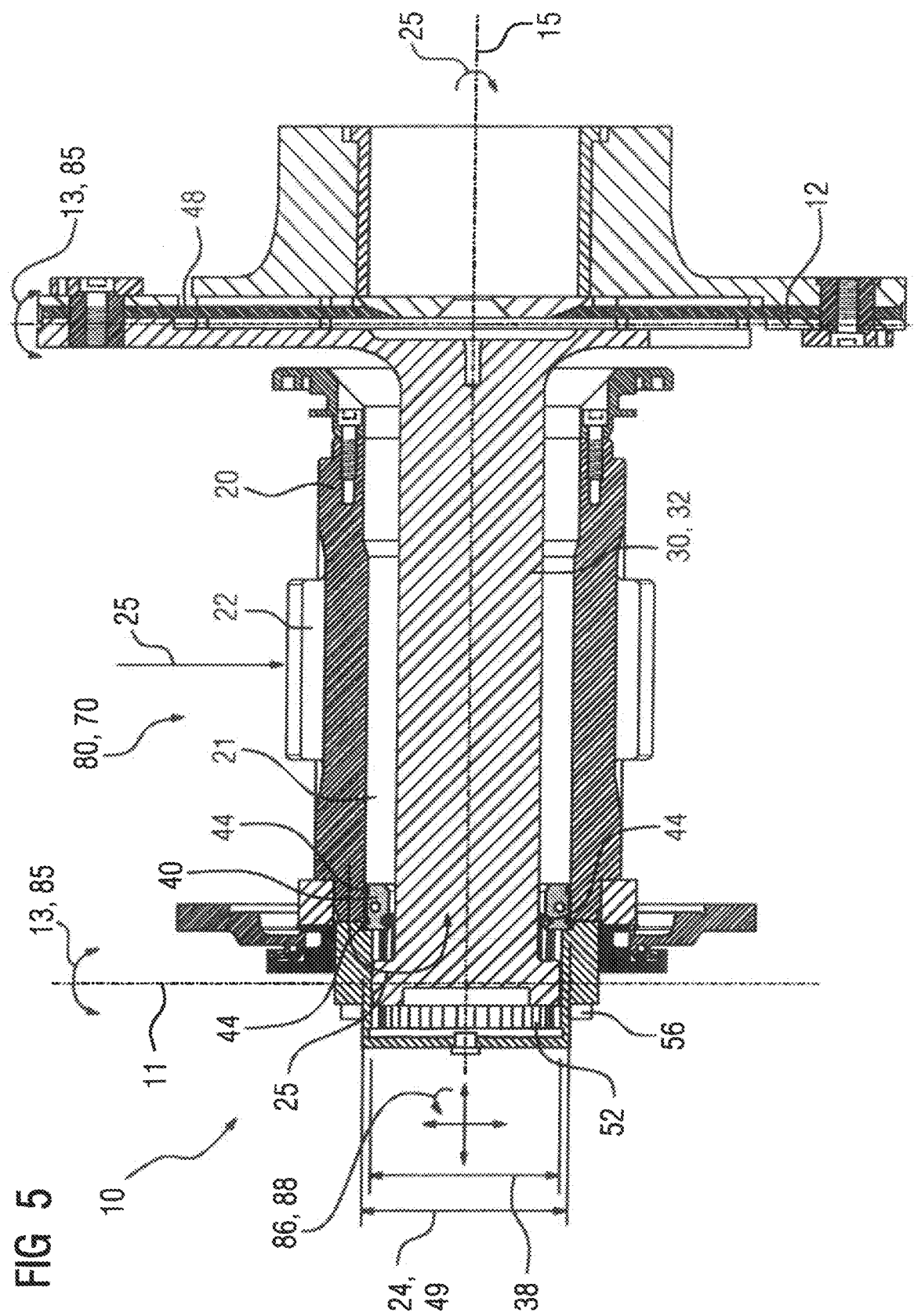
FIG. 5 shows a longitudinal section of the first embodiment of the claimed double-jointed coupling in the assembled state.

FIG. 5 illustrates the first embodiment of the claimed double-jointed coupling 10 as a longitudinal section in the mounted state. In this case, the carrier ring 50 is fitted with fixing means 56 which are in the form of screws to the hollow pinion shaft 20. By means of the coupling tooth arrangement 34 which engages in the internal tooth arrangement 52 of the carrier ring 50, a transmission of torque 35 from the hollow pinion shaft 20 to the intermediate shaft 30 is ensured.

In that the coupling tooth arrangement 34 is in the form of a spiral tooth arrangement 36, the first articulation plane 11 of the double-jointed coupling 10 is thereby achieved. The second articulation plane 12 is achieved by the lamellar flange 35 and the lamella bundles which are connected thereto. The tilting movements 13 with respect to the first and second articulation planes 11, 12 at least partially define a kinematic arrangement 85 of the double-jointed coupling 10. The kinematic arrangement 85 is also influenced by the bending behavior of the lamella bundles 48. Similarly, the kinematic arrangement 85 of the double-jointed coupling 10 is by the deformation behavior of the components thereof, for example, a torsion rigidity of the intermediate shaft 30 relative to the rotation axis 15. On the basis of at least some of these data items, the static and dynamic behavior of the double-jointed coupling 10 can be mapped and simulated. The double-jointed coupling 10 and the kinematic arrangement 85 thereof are stored in a computer program product 80 so that a reaction 88 of the double-jointed coupling 10 to a predeterminable stress 86 can be established. Both the stress 86 and the reaction 88 can involve forces and torques which can be established in a temporally resolved manner. For example, a stress 86 can be predetermined as an input for the computer program product 80, by which input a travel operation of a rail vehicle 70 which is not shown in greater detail is mapped. Accordingly, the operating behavior of the double-jointed coupling 10 can be simulated by the computer program product 80.

FIG. 6 schematically shows the construction of a second embodiment of the claimed double-jointed coupling 10 as a longitudinal section. The double-jointed coupling 10 has a hollow pinion shaft 20, through which an intermediate shaft 30 is introduced. The intermediate shaft 30 has at a first end 31 which faces a carrier ring 50 with an internal tooth arrangement 52 a coupling tooth arrangement 34 which is in the form of a spiral tooth arrangement 36. In this case, the coupling tooth arrangement 34 is integrally constructed with the intermediate shaft 30 in this case. The carrier ring 50 is releasably connected via fixing means 56 which are in the form of screws to the hollow pinion shaft 20. The coupling tooth arrangement 34 has an external diameter 38 which is smaller than an internal diameter 24 of an internal space 21 of the hollow pinion shaft 20. The spiral tooth arrangement 36 meshes with the internal tooth arrangement 52 and is constructed in a tiltable manner relative to a rotation axis 15 of the double-jointed coupling 10. A corresponding tilting movement 13 at the first end 31 of the intermediate shaft 30 defines a first articulation plane 11 of the double-jointed coupling 10. Furthermore, a thrust ring 40 which is provided at the external face 41 thereof and the internal face 43 thereof with at least one groove 46 in which a sealing element 44 is received is arranged between the hollow pinion shaft 20 and the carrier ring 50. The thrust ring 40 is securely clamped in the assembled state between the carrier ring 50 and the hollow pinion shaft 20. As a result of the releasable connection between the carrier ring 50 and the hollow pinion shaft 20 and the engagement between the coupling tooth arrangement 34 at the first end 31 of the intermediate shaft 30 and the internal tooth arrangement 52, it is possible to transmit torque 25 to the intermediate shaft 30. The transmission of the torque 25 is depicted in FIG. 6 with arrows.

The intermediate shaft 30 is in the form of a hollow shaft and has a shaft portion 32 between the first end 31 and a second, opposite end 33. At the second end 33, a coupling tooth arrangement 34 which meshes with an internal tooth arrangement 52 of an additional coupling component 57 is constructed. At the second end 33 of the intermediate shaft 30, there is thereby allowed a tilting movement 13, by which a second articulation plane 12 of the double-jointed coupling 10 is achieved. The tilting movements 13 at the first and second articulation planes 11, 12 belong to a kinematic arrangement 85 of the double-jointed coupling 10 which can be simulated by a corresponding computer program product 80. A deformation of the shown components, for example, the torsion behavior of the intermediate shaft 30, also belong to the kinematic arrangement 85 of the double-jointed coupling 10. The double-jointed coupling 10 according to FIG. 6 is depicted in the computer program product 80 which is not shown in greater detail. By inputting a stress 86 which involves forces and torques, the computer program product 80 is constructed, for example, to simulate a travel behavior of a rail vehicle 70 and to simulate a reaction 88 of the double-jointed coupling 10. The reaction 88 can in this case also comprise forces and torques.

Figure 7:
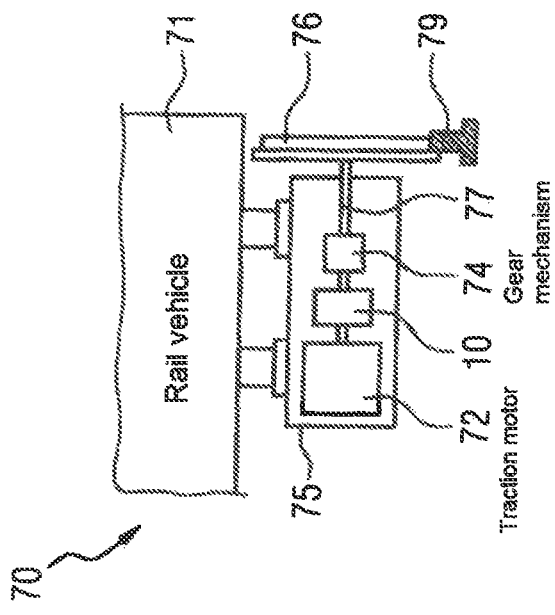
FIG. 7 schematically shows the structure of an embodiment of the claimed rail vehicle.

FIG. 7 schematically illustrates the construction of an embodiment of the claimed rail vehicle 70 which travels by means of a wheel 76 on a rail 79. The rail vehicle 71 comprises a wagon body 71, on which a bogie 75 is fixed. The bogie 75 comprises a traction motor 72 which is connected to a double-jointed coupling 10 so as to transmit torque. The double-jointed coupling is in turn connected so as to transmit torque to a gear mechanism 74 which is in turn connected to the wheel 76 via an axle 77 so as to transmit torque. The double-jointed coupling 10 is constructed according to one of the above-indicated embodiments.

Figure 8:
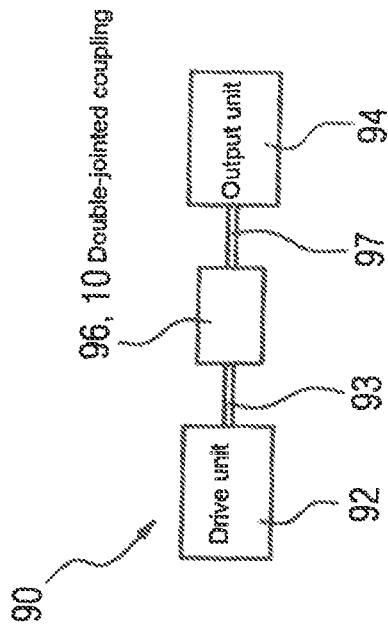
FIG. 8 schematically shows the structure of an embodiment of the claimed industrial application.

FIG. 8 further shows a schematic construction of an embodiment of the claimed industrial application 90 which comprises a drive unit 92 which may be in the form of an electric motor, combustion engine or hydraulic motor, A drive power which is intended to be transmitted to the output unit 94 via an output shaft 93 is provided by the drive unit 92. The drive unit 94 may, for example, be in the form of a mill, vertical mill, sugar mill, cement mill, stone breaker, conveyor belt, pump, roller press, slat conveyor, drilling mill, rotary furnace, rotary mechanism, agitating mechanism, lifting apparatus, milling press or scrap crusher. To this end, the output unit 94 has an input shaft 97 which is connected via a coupling 96 to the output shaft 93 of the drive unit 92. According to the invention the coupling 96 is in the form of a double-jointed coupling 10 according to one of the above-indicated embodiments.

What is claimed is:

1. A double-jointed coupling, comprising:
   a carrier ring including an internal tooth arrangement;
   a hollow pinion shaft connected to the internal tooth arrangement of the carrier ring;
   an intermediate shaft including a coupling tooth arrangement for engagement in the internal tooth arrangement, said coupling tooth arrangement constructed on the intermediate shaft such as to enable passage of the intermediate shaft through the hollow pinion shaft;
   a sealing element arranged on an external face of the thrust ring; and
   a thrust ring arranged on the intermediate shaft in a region of the coupling tooth arrangement and constructed for passage through the hollow pinion shaft.

2. The double-jointed coupling of claim 1, wherein the coupling tooth arrangement is integrally constructed with the intermediate shaft.

3. The double-jointed coupling of claim 1, further comprising a sealing element arranged at an internal face of the thrust ring and constructed to fix the thrust ring to the intermediate shaft.

4. The double-jointed coupling of claim 1, wherein the thrust ring is constructed for axial support on the hollow pinion shaft.

5. The double-jointed coupling of claim 1, wherein the carrier ring is releasably connected to the hollow pinion shaft.

6. The double-jointed coupling of claim 1, wherein the carrier ring is integrally constructed with the hollow pinion shaft.

7. The double-jointed coupling of claim 1, wherein the intermediate shaft is integrally constructed with a lamellar flange.

8. The double-jointed coupling of claim 1, wherein the Intermediate shaft is embodied in the form of a hollow shaft.

9. A bogie of a rail vehicle, said bogie comprising:
   a double-jointed coupling as set forth in claim 1;
   a traction motor connected to the double-jointed coupling so as to transmit torque to the double-jointed coupling; and
   a gear mechanism connecting the double-jointed coupling to an axle and/or a wheel so as to transmit torque.

10. A rail vehicle, comprising:
    a wagon body; and
    a bogie fixed to the wagon body, said bogie being constructed as set forth in claim 9.

11. An industrial application, comprising:
    a double-jointed coupling as set forth in claim 1; and
    a drive unit connected to an output unit so as to transmit torque via the double-jointed coupling.

12. A method for assembling a double-jointed coupling, said method comprising:
    fitting a thrust ring to an Intermediate shaft;
    introducing the intermediate shaft through a hollow pinion shaft;
    fitting at least one sealing element and a securing element to an external face of the thrust ring;
    fixing a carrier ring having an Internal tooth arrangement to the hollow pinion shaft for engagement with a coupling tooth arrangement of the Intermediate shaft.

* * * * *